United States Patent [19]
Masuda et al.

[11] Patent Number: 5,994,439
[45] Date of Patent: Nov. 30, 1999

[54] VINYL CHLORIDE RESIN COMPOSITION FOR POWDER MOLDING

[75] Inventors: Toshio Masuda; Manabu Ogiwara; Hideaki Hayashi, all of Kawasaki; Junzo Ukai; Hideo Nishimura, both of Toyota, all of Japan

[73] Assignee: Zeon Kasai Co., Ltd., Tokyo, Japan

[21] Appl. No.: 09/073,341

[22] Filed: May 6, 1998

[30] Foreign Application Priority Data

May 6, 1997 [JP] Japan ................................ 9-131669

[51] Int. Cl.$^6$ ................ C08J 5/10; C08R 5/09; C08R 5/12; C08L 27/06
[52] U.S. Cl. ............................ 524/295; 524/285
[58] Field of Search ..................... 524/284, 295

[56] References Cited

U.S. PATENT DOCUMENTS 5,321,090  6/1994  Nakatsuji et al. .................. 525/221

FOREIGN PATENT DOCUMENTS 60-90221   5/1985   Japan .
2138355    5/1990   Japan .
5279485   10/1993   Japan .

Primary Examiner—James J. Seidleck
Assistant Examiner—U. K. Rajguru
Attorney, Agent, or Firm—Sherman and Shalloway

[57] ABSTRACT

Provided is a vinyl chloride resin composition for powder molding comprising:

(1) 100 parts by weight of a vinyl chloride resin powder having an average polymerization degree p of 600 to 3000 and an internal pore volume of 0.20 ml/g or more, (2) 80 to 150 parts by weight of a trimellitic ester having an alkyl group with a principal chain having an average carbon number n of 6 to 9, and (3) 5 to 25 parts by weight of a fine vinyl chloride resin having an average polymerization degree q of 400 to 1300 and a primary grain size distribution of two modes in which a smaller mode falls in a grain size range of 0.1 to 0.4 µm and a larger mode falls in a grain size range of 0.9 to 1.4 µm, wherein the parts by weight L of the trimellitic ester shown in (2), p and n each described above have the relation satisfying an equation (I):

$$5 < [\{(n-8) \times 5 + L\}/p] \times 100 < 12 \qquad (I)$$

This vinyl chloride resin composition is improved in a coldproof property and a thermal degradation resistance.

6 Claims, No Drawings

VINYL CHLORIDE RESIN COMPOSITION FOR POWDER MOLDING

The present invention relates to a vinyl chloride resin composition improved in a coldproof property in powder molding processing, such as powder slush molding, fluidised bed coating, rotational molding, powder coating, etc., while securing a moldability and a non-fogging property and capable of molding a skin material for an air bag door to which a coldproof property is required on the same molding conditions as in a conventional crush pad.

Soft vinyl chloride resin products are used for automobile interior materials, for example, a crush pad, a glove box, a console box, a door trim, an arm rest and a head rest in many cases. A lot of products made of vinyl chloride resin for powder molding (particularly powder slush molding) and backed with foamed polyurethane are used for a crush pad, a glove box, a console box, a door trim and the like. Further, in recent years, a reduction in costs tends to be attempted by producing air bag doors and crush pads by integrated molding or package molding using the same die or changing a process of foamed polyurethane backing from a conventional separate foaming method to an integrated foaming method.

An air bag door is a mechanism which is opened by rapid expansion of an air bag in a collision and susceptible to breakage caused by impact. In particular, it is feared that a skin material thereof causes brittle fracture in operation at low temperatures and broken pieces thereof may bring about secondary accidents. Accordingly, a coldproof property and a thermal degradation resistance (i.e., heat aging resistance) which are improved to a large extent as compared with those of conventional crush pad materials are required of an air bag door material.

Plasticizers have so far been required to be added in large quantities in order to improve a coldproof property and a thermal degradation resistance of a vinyl chloride resin composition. However, such method has involved the antinomic problem that the melt property and the depowdering property in slush molding are poor. In slush molding, a compound is contacted to a rotating heated die and molten until the prescribed wall thickness is obtained, and then a box containing the compound is separated from the die, followed by completing melting of the powder compound on a die surface. In this case, when the die finishes rotating, the compound which is to be recovered in the box adheres partially on the die surface in a certain case. "A depowdering property in slush molding is poor" means that such phenomenon takes place. If this phenomenon occurs, brought about the problem that a sheet weight exceeds a designed value thereof and incompletely molten portions inhibit adhesion of backing polyurethane.

Proposed as a method for solving these problems is a production process for a vinyl chloride resin composition for powder baking, characterized by mixing 100 parts by weight of a vinyl chloride resin with 30 to 130 parts by weight of a plasticizer at 80 to 150° C. and cooling the mixture down to 70° C. or lower, followed by blending 1 to 20 parts by weight of a vinyl chloride resin for dusting having a grain diameter of 0.1 to 10 $\mu$m, preferably about 1 $\mu$m (Japanese Laid-Open Publication 90221/1985). In this method, it is noted that higher alcohol esters of trimellitic acid can be used as the plasticizer in addition to typical plasticizers, for example, phthalic esters such as dioctyl phthalate and adipic esters such as dioctyl adipate, and recommended as the vinyl chloride resin described above are resins having an average polymerization degree of 500 to 1500 and a grain size distribution of 50 to 300 $\mu$m and as the vinyl chloride resin for dusting described above, resins having a polymerization degree of 500 to 3500.

Further, it is reported in Japanese Laid-Open Publication 279485/1993 (Japanese Patent Publication 2550258) that in the method described above, a resin having an accumulated pore volume of 0.270 ml/g or more is used as the vinyl chloride resin and a trimellitic ester is used as the plasticizer, whereby a vinyl chloride resin composition which is excellent in an initial processability, a fluidity and a non-fogging property can be obtained.

An object of the present invention is to provide a vinyl chloride resin composition which is improved in a fogging property, a coldproof property and a thermal degradation resistance.

The present inventors have intensively investigated to provide a vinyl chloride resin composition for powder molding for obtaining a sheet which has a good depowdering property in molding and is excellent in a fogging property, a coldproof property and a thermal degradation resistance, and as a result thereof, they have come to complete the present invention.

Thus, according to the present invention, provided is a vinyl chloride resin composition for powder molding comprising:

(1) 100 parts by weight of a vinyl chloride resin powder having an average polymerization degree p of 600 to 3000 and an internal pore volume of 0.20 ml/g or more, (2) 80 to 150 parts by weight of a trimellitic ester having an alkyl group with a principal chain having an average carbon number n of 6 to 9, and (3) 5 to 25 parts by weight of a fine vinyl chloride resin having an average polymerization degree q of 400 to 1300 and a primary grain size distribution of two modes in which a smaller mode falls in a grain size range of 0.1 to 0.4 $\mu$m and a larger mode falls in a grain size range of 0.9 to 1.4 $\mu$m, wherein the parts by weight L of the trimellitic ester shown in (2), p and n each described above have the relation satisfying an equation (I):

$$5<[\{(n-8)\times5+L\}/p]\times100<12 \qquad (I)$$

The vinyl chloride resin (1) and the fine vinyl chloride resin (3) mean copolymers comprising 50% by weight or more of vinyl chloride and 50% by weight or less of a comonomer in addition to homopolymers of vinyl chloride. Examples of the comonomers in such vinyl chloride copolymers include olefins such as ethylene and propylene; halogenated olefins such as allyl chloride, vinylidene chloride, vinyl fluoride and ethylene trifluorochloride; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters thereof or acid anhydrides thereof such as acrylic acid, maleic acid, itaconic acid, 2-hydroxyethyl acrylate, methyl methacrylate, monomethyl maleate, diethyl maleate and maleic anhydride; unsaturated nitriles such as acrylonitrile and methacrylonitrile; acrylamides such as acrylamide, N-methylolacrylamide, acrylamide-2-methylpropanesulfonic acid and (meth)acrylamidepropyltrimethylammonium chloride; and allylamines and derivatives thereof such as allylamine benzoic acid salt and dialyldimethylammonium chloride. These vinyl chloride resins are preferably obtained by a suspension polymerization method.

The vinyl chloride resin (1) has an average polymerization degree of 600 to 3000, preferably 800 to 2500 and particularly preferably 1000 to 2500. In order to allow this vinyl chloride resin to reveal a high coldproof property, employed are methods in which an addition amount of the plasticizer (trimellitic ester) is increased more than usual and a product having a long alkyl chain length is used for the plasticizer (trimellitic ester). However, employment of these methods tends to bring about the problems such as a deterioration in an absorptivity of the plasticizer, a reduction in a powder property of the compound and a degradation in a depowdering property thereof, and therefore a porosity of the vinyl chloride resin has to be raised to improve the absorptivity of the plasticizer. A porosity of the vinyl chloride resin is shown by an internal pore volume. In the present invention, the internal pore volume has to be 0.20 ml/g or more, preferably 0.25 ml/g or more. In general, the porosity is related to the polymerization degree, and the higher the polymerization degree is, the higher the porosity tends to be as well.

The average polymerization degree described above is determined according to a method prescribed in JIS K6721. The internal pore volume described above is shown by a volume (ml/g) of mercury pressed into vinyl chloride resin grains while applying pressure from atmospheric pressure to 14,000 psi G by means of a mercury pressing type porosimeter manufactured by Aminco Co., Ltd.

The trimellitic ester described above as the plasticizer is excellent in a non-fogging property as compared with a phthalate plasticizer but inferior in an absorptivity into a vinyl chloride resin. Accordingly, it is effective for enhancing the coldproof property to increase the addition amount of the trimellitic ester (2) more than usual or to use the trimellitic ester (2) having a longer alkyl chain length and/or a higher normal percentage.

The addition amount of the trimellitic ester (2) is 80 to 150 parts, preferably 90 to 140 parts. The amount of less than 80 parts can not secure the coldproof property. On the other hand, the amount of more than 150 parts makes the baked sheet too soft and therefore brings about the problems that the sheet stretches in releasing from a die and wrinkles are produced skin when foaming urethane and that handling is difficult. When the vinyl chloride resin (1) has a large average polymerization degree, the more the addition amount of the trimellitic ester (2), the more preferable.

A molecular structural factor by which the trimellitic ester (2) exerts an influence on the coldproof property lies in a chain length of the alkyl group thereof. However, a chain length of the principal chain exerts a larger influence, and a chain length of the side chain exerts a smaller influence.

The alkyl group has a principal chain length of 6 or more and 9 or less, preferably 7 to 8 on the average. A trimellitic ester plasticizer in which an alkyl group has a principal chain length of less than 6 has to be used in a large amount in order to achieve the object of the present invention and therefore brings about a reduction in the physical properties. On the other hand, a trimellitic ester in which an alkyl group has a principal chain length of larger than 9 is inferior in an absorptivity into the vinyl chloride resin and provides the bad powder property, so that the problem of the depowdering property is brought about.

In the present invention, the parts by weight L of the trimellitic ester (2), p and n each described above have to have the relation satisfying the equation (I):

$$5<[\{(n-8)\times5+L\}/p]\times100<12 \qquad (I)$$

In general, a dusting agent is added to a vinyl chloride resin composition for powder molding processing in order to enhance a powder fluidity of a compound. The fogging property is influenced according to the selection of the dusting agent. In particular, when a large amount of a plasticizer is added, the fogging becomes larger by an influence of low boiling matters contained in the plasticizer, such as unreacted alcohol, and therefore the selection of the dusting agent is important.

In the present invention, some kind of a fine vinyl chloride resin is used as a dusting agent.

In general, the fine vinyl chloride resin having an average polymerization degree of 400 to 1300 is classified as follows from the viewpoint of primary grain size distribution:

(a) a resin having a grain size distribution of two modes, that is, a resin having two peaks in a grain size distribution (this type is observed in fine vinyl chloride resins obtained by a seeding emulsion polymerization method in many cases);

(b) a resin having a grain size distribution close to a normal distribution (this type is observed in fine vinyl chloride resins obtained by a fine suspension polymerization method in many cases, and many resins have a grain average diameter falling usually in a range of 0.1 to 2.5 $\mu$m, particularly 0.9 to 1.2 $\mu$m); and (c) a resin having a grain size distribution of one mode (this type is observed in fine vinyl chloride resins obtained by an emulsion polymerization method in many cases; in general, they have one mode falling in a grain size range of 0.1 to 0.5 $\mu$m).

The present inventors used the respective types of these fine vinyl chloride resins (a), (b) and (c) as dusting agents to test a fogging property. As a result thereof, it has become clear that the resin of the type (b) tends to cause intense fogging and the resin of the type (c) does not have an effect as the dusting agent. It is estimated that the resin of the type (b) tends intensely to cause fogging due to a auxiliary material used in polymerization. Further, the resin of the type (c) does not have an effect as the dusting agent because of the reasons that it has a smaller grain size as compared with those of the resins of the type (a) and the type (b) and therefore has a relatively very large surface area, which in turn results in a too large absorbing rate of the plasticizer and that it tends to absorb as well the plasticizer adsorbed on the vinyl chloride resin (1) described above. In contrast with this, it has been confirmed that among the resins of the type (a), the fine vinyl chloride resins in which the smaller mode falls in a grain size range of 0.1 to 0.4 $\mu$m and the larger mode falls in a grain size range of 0.9 to 1.4 $\mu$m, particularly the resins in which the weight of the grains belonging to the smaller mode accounts for 1 to 30% by weight, particularly 5 to 20% by weight based on the whole weight of the fine vinyl chloride resins, are excellent in a balance of an absorptivity of the plasticizer with the vinyl chloride resin (1) described above and has an excellent function as the dusting agent and that in addition thereto, they do not cause fogging.

The primary grain size distribution described above has been determined by preparing a 0.5% by weight aqueous dispersion of the fine vinyl chloride resin by means of a ultrasonic shaker and charging this dispersion into a laser diffraction/diffusion type particle size distribution meter "LA-910" manufactured by Horiba Seisakusho Co., Ltd.

In the composition of the present invention, the addition amount of the fine vinyl chloride resin (3) is 5 to 25 parts by weight, preferably 8 to 17 parts by weight per 100 parts by weight of the vinyl chloride resin powder (1). The addition amount of less than 5 parts by weight makes the dusting agent short and therefore reduces the powder property. On the other hand, the addition amount exceeding 25 parts by weight makes the dusting agent excess and makes the compound system uneven.

A manner for combining the vinyl chloride resin (1) with the fine vinyl chloride resin (3) shall not specifically be restricted. For example, when a vinyl chloride homopolymer is used as the vinyl chloride resin (1), a vinyl chloride homopolymer or a copolymer of vinyl chloride and the copolymerizable monomer described above can be used as the fine vinyl chloride resin (3). Further, also when a vinyl chloride copolymer is used as the vinyl chloride resin (1), a vinyl chloride homopolymer or a copolymer of vinyl chloride and the copolymerizable monomer described above can be used as the fine vinyl chloride resin (3).

The composition of the present invention can be blended with various stabilizers against heat and light which are usually blended into vinyl chloride resin compositions for general purpose and vinyl chloride resin compositions for powder molding.

Examples of such stabilizers for the vinyl chloride resin compositions for general purpose include organic phosphite stabilizers, epoxy stabilizers, polyol stabilizers, nitrogen-containing compound stabilizers, sulfur-containing compound stabilizers and phenolic anti-oxidants as well as metal stabilizers such as zeolite, calcium hydroxide, calcium oxide, calcium silicate, various metallic soaps, organic tin stabilizers, lead stabilizers and antimony stabilizers. Examples of such stabilizers for the vinyl chloride resin compositions for powder molding include β-diketones proposed in Japanese Laid-Open Publication 268745/1989 and Japanese Laid-Open Publication 279640/1994 as well as perchloric acid compounds and perchloric acid-introduced type hydrotalcite compounds such as hydrotalcite compounds, barium perchlorate and magnesium perchlorate each proposed in Japanese Laid-Open Publication 270645/1987, Japanese Laid-Open Publication 66738/1991, Japanese Laid-Open Publication 156106/1993 and Japanese Laid-Open Publication 279640/1994. Further, as described in Japanese Laid-Open Publication 156106/1993, zeolite can be used in combination for the purpose of enhancing the fluidity and the stability.

Hydrotalcite is carbonate hydrate ore represented by a formula:

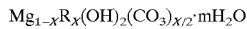

$$Mg_{1-x}R_x(OH)_2(CO_3)_{x/2}\cdot mH_2O$$

(x is a real number falling in a range of 0<x≦0.5; m is 0 or a real number; and R is Al, Cr or Fe) of a hexagonal system and a rhombohedral trigonal lattice, and ores belonging to this group are isomorphic to each other. In the present invention, there can be used either of natural hydrotalcite produced as a product of a low temperature hydrothermal process in serpentine and other stones containing a lot of magnesium and synthetic hydrotalcite. Methods described in Japanese Patent Publication 2280/1971, Japanese Patent Publication 30039/1975, Japanese Patent Publication 29129/1976 and Japanese Laid-Open Publication 174270/1986 can be given as examples of a synthetic method for hydrotalcite. In the present invention, such hydrotalcites can be used without being restricted by a crystalline structure thereof, a grain diameter, the presence of crystallization water and an amount thereof. Further, in the present invention, there can be used perchloric acid-partially modified type or perchloric acid-modified type hydrotalcite in which a part or all of $CO_3$ contained in hydrotalcite is substituted with $ClO_4$, obtained by reacting hydrotalcite with perchloric acid in water at an optional rate. The addition amount of these hydrotalcites is usually 0.01 to 5.0 parts by weight per 100 parts by weight of the vinyl chloride resin.

In the composition of the present invention, there can be used if necessary, in addition to the stabilizers against heat and light described above, fillers, anti-oxidants, colorants, flame retardants, foaming agents and releasing agents which are usually used as compounding components in vinyl chloride resin compositions.

The examples of the present invention shall be shown below but the present invention shall not be restricted thereto.

A composition used in the examples is as follows:

|  | Parts by weight |
| --- | --- |
| Vinyl chloride resin (vinyl chloride homopolymer) (refer to Table 1) | 100 |
| Trimellitic ester (refer to Table 2) | Variable |
| Fine vinyl chloride resin (vinyl chloride homopolymer) (refer to Tables 3 and 4) | variable |
| Hydrotalcite | 1 |
| Sodium perchlorate | 0.5 |
| UV absorber | 0.2 |
| Zinc stearate | 0.2 |
| Pigment | 2 |

In blending the composition described above, the respective components excluding the trimellitic ester and the fine vinyl chloride resin (dusting agent) were put into a Honschell mixer and mixed, and the trimellitic ester was added when the temperature went up to 80° C. After drying up, the fine vinyl chloride resin was added and mixed at a stage where the mixture was cooled down to 50° C., whereby a vinyl chloride resin composition for powder slush molding was prepared. Compositions thereof and evaluation results thereof are shown in Tables 5 to 7.

"Depowdering property", "melt property", "elongation after degradation", "fogging property" and "air bag-expanding test" were determined by the following methods. Underlines shown in the following tables mean that the requisites of the present invention are not satisfied.

TABLE 1

| Vinyl chloride resin (commercial product) | | | | | | |
| --- | --- | --- | --- | --- | --- | --- |
| Vinyl chloride resin | A | B | C | D | E | F |
| Average polymerization degree | 1000 | 800 | 1300 | 1400 | 2500 | 700 |
| Internal pore volume (ml/g) | 0.257 | 0.181 | 0.277 | 0.357 | 0.420 | 0.148 |

TABLE 2

| Trimellitic ester | | | | | |
| --- | --- | --- | --- | --- | --- |
| Alkyl group/Trimellitic ester | I | II | III | IV | V |
| n-$C_6$ |  |  | 18 |  |  |
| n-$C_7$ |  |  |  | 25 |  |
| n-$C_8$ | 100 |  | 77 |  |  |
| n-$C_9$ |  |  |  | 25 | 100 |
| n-$C_{10}$ |  |  | 5 |  |  |
| iso-$C_7$ |  |  |  | 25 |  |
| 2Ethyl Hexyl |  | 100 |  |  |  |
| iso-$C_9$ |  |  |  | 25 |  |
| Average principal chain length of alkyl group | 8 | 6 | 7.74 | 6.75 | 9 |

TABLE 3

Fine vinyl chloride resin (commercial product)

| Fine vinyl chloride resin | $a_1$ | $a_2$ | $a_3$ |
|---|---|---|---|
| Average polymerization degree | 850 | 700 | 1500 |
| Grain size distribution | Two mode distribution | Two mode distribution | Two mode distribution |
| | Main mode 1.1 μm | Main mode 1.2 μm | Main mode 1.2 μm |
| | Sub mode 0.2 μm | Sub mode 0.2 μm | Sub mode 0.2 μm |

TABLE 4

Fine vinyl chloride resin (commercial product)

| Fine vinyl chloride resin | $b_1$ | $b_2$ | $c$ |
|---|---|---|---|
| Average polymerization degree | 850 | 850 | 900 |
| Grain size distribution | Regular distribution | Regular distribution | One mode distribution |
| | Broadly distributed from 0.2 to 2.2 μm peak at 1.1 μm | Broadly distributed from 0.2 to 2.5 μm peak at 1.2 μm | 0.2 μm |

Depowdering property:

A box type die (made of nickel, thickness: 3 mm) having a dimension of 100 mm×110 mm×50 mm was heated to 230° C. and then installed with a stainless steel-made powder box containing 300 g of a vinyl chloride resin composition for powder slush molding with a face thereof turned upside down. The die was reciprocatively rotated at 360 degrees and dipped in water after leaving for standing for 60 seconds to detach the powder box. Then, the resulting sheet having a dimension of 100 mm×110 mm×1 mm was taken out to observe a state of a back face (face which did not contact the die) of the sheet. The depowdering property was evaluated by a thickness of the sheet according to the following criteria:

O: sheet thickness is apparently leveled
X: sheet is rugged and has uneven thickness Melt property:

The back face of the sheet obtained in the test of the depowdering property described above was observed to evaluate the melt property according to the following criteria:

O: glossy
X: no gloss

Elongation after degradation test:

A die (made of nickel) having a dimension of 300 mm×200 mm×3 mm was heated to 250° C., and a powder vinyl chloride resin composition was put thereon. After an elapse of 10 seconds, the die was turned over to remove the surplus powder which was not stuck thereto and was left for standing for 30 seconds to carry out baking. Then, the die was immersed in water for cooling to peel the sheet off. A sample sheet having a dimension of 145 mm×200 mm×1 mm was cut out from the vinyl chloride resin sheet thus obtained and laid in a die having a dimension of 147 mm×217 mm×10 mm. Then, a mixture of 16.9 g of modified MDI type isocyanate and 31.4 g of polyether polyol (containing 1.0% by weight of triethylenediamine and 1.6% by weight of water) was poured on the sheet, and the die was closed tightly. After 10 minutes, the sample backed with foamed polyurethane having a thickness of 9 mm on a skin having a thickness of 1 mm was taken out from the die. The sample was held at 110° C. for 2000 hours in a Geer oven (hot air circulating electric oven with rotating table) for degradation, and then the skin sheet was peeled off. The skin sheet described above was punched with a JIS K7127 No. 4 dumbbell to determine an elongation at a drawing speed of 200 mm/second at −10° C. If the measured value is 20% or more, the low temperature resistance is judged good. If degraded, the measured value is reduced to 10% or less.

Fogging property:

A sample sheet having a dimension of 50 mm×100 mm×1 mm was cut out from the sheet having a dimension of 100 mm×110 mm×1 mm obtained in the test of the depowdering property described above and put into a glass bottle, which was covered with a transparent glass plate. The glass bottle was left for standing for 20 hours in an oil bath of 100° C., and then a haze (cloudiness) of the glass plate was determined. An automatic direct-reading haze computer Model HGM-2DP manufactured by Suga Tester Co., Ltd. was used for the tester.

It is shown that the smaller this value is, the less the fogging is caused.

Expansion test of air bag:

A die for an air bag lid was heated to 250° C., and a vinyl chloride resin composition for powder molding was put thereinto. After 10 seconds, the die was turned over to remove the surplus powder and left for standing for 30 seconds to carry out baking. Then, the die was cooled in water to peel the sheet off. The sheet was backed with foamed polyurethane in the same manner as in the above-described test for determining the elongation after degradation and put in a Geer oven of 110° C. After an elapse of 2000 hours, the sheet was set up on an air bag door under an atmosphere of −10° C. The door was opened momentarily by expanding the air bag at a back face by applying an impact, and then the sheet on the door surface was observed to evaluate it according to the following criteria:

O: sheet has been extended but no cracks are produced
X: cracks are observed on the sheet

TABLE 5

| | | Example 1 | Example 2 | Example 3 | Example 4 | Example 5 | Example 6 | Example 7 | Example 8 | Example 9 |
|---|---|---|---|---|---|---|---|---|---|---|
| Vinyl chloride resin | | A | D | E | A | A | A | C | C | C |
| Trimellitic ester | I | 100 | 130 | 140 | | | | | | |
| | II | | | | 100 | 110 | | | | |
| | III | | | | | | 100 | | | |

TABLE 5-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  | IV |  |  |  |  |  |  | 110 |  |  |
|  | V |  |  |  |  |  |  |  | 100 | 95 |
| Fine vinyl chloride resin | $a_1$ | 15 |  | 17 | 15 | 17 | 15 |  | 16 | 16 |
|  | $a_2$ |  | 15 |  |  |  |  | 15 |  |  |
|  | $a_3$ |  |  |  |  |  |  |  |  |  |
| Value of the equation (I) |  | 10 | 9.28 | 5.6 | 9.0 | 10.0 | 9.9 | 8.0 | 8.1 | 7.7 |
| Depowdering property |  | ○ | ○ | ○ | ○ | ○ | ○ | ○ | ○ | ○ |
| Melt property |  | ○ | ○ | ○ | ○ | ○ | ○ | ○ | ○ | ○ |
| Elongation after degradation test |  | 50 | 120 | 140 | 20 | 50 | 40 | 70 | 80 | 50 |
| Fogging property |  | 1.2 | 2.3 | 2.5 | 2.0 | 1.8 | 1.8 | 2.0 | 2.4 | 2.5 |
| Air bag expansion test |  | ○ | ○ | ○ | ○ | ○ | ○ | ○ | ○ | ○ |

TABLE 6

|  |  | Comparative Example 1 | Comparative Example 2 | Comparative Example 3 |
|---|---|---|---|---|
| Vinyl chloride resin |  | B | F | D |
| Trimellitic ester | I | 80 | 85 | 65 |
|  | II |  |  |  |
|  | III |  |  |  |
|  | IV |  |  |  |
|  | V |  |  |  |
| Fine vinyl chloride resin | $a_1$ | 10 | 10 |  |
|  | $a_2$ |  |  | 15 |
|  | $a_3$ |  |  |  |
| Value of the equation (I) |  | 10 | 12.1 | 4.6 |
| Depowdering property |  | ○ | × | ○ |
| Melt property |  | ○ | ○ | × |
| Elongation after degradation test |  | 0 | —* | 0 |
| Fogging property |  | 1.8 | — | 2.0 |
| Air bag expansion test |  | × | —* | × |

*:The sheet had large irregularities, so that the sheet having a uniform thickness was not obtained.

TABLE 7

|  |  | Comparative Example 4 | Comparative Example 5 | Comparative Example 6 | Comparative Example 7 |
|---|---|---|---|---|---|
| Vinyl chloride resin |  | A | A | A | A |
| Trimellitic ester | I | 100 | 100 | 100 | 100 |
|  | II |  |  |  |  |
|  | III |  |  |  |  |
|  | IV |  |  |  |  |
|  | V |  |  |  |  |
| Fine vinyl chloride resin | $a_3$ | 15 |  |  |  |
|  | $b_1$ |  | 15 |  |  |
|  | $b_2$ |  |  | 15 |  |
|  | c |  |  |  | 15 |
| Value of the equation (I) |  | 10.0 | 10 | 10.0 | 10.0 |
| Depowdering property |  | ○ | ○ | ○ | × |
| Melt property |  | × | ○ | ○ | ○ |
| Elongation after degradation test |  | 50 | 50 | 50 | —* |
| Fogging property |  | 1.6 | 6.7 | 7.2 | 1.1 |
| Air bag expansion test |  | × | ○ | ○ | × |

The sheet had large irregularities, so that the sheet having a uniform thickness was not obtained.

Summarizing the results shown in Tables 5 to 7, the following can be noted.

The vinyl chloride resin compositions for powder molding prepared in Examples 1 to 9 falling within the scope of the present invention have good depowdering properties and melt properties, and the sheets obtained by molding scarcely cause fogging. Further, the elongations after degradation test are good, and cracks are not produced in the air bag expansion test. Accordingly, they have been judged excellent in a coldproof property.

In Examples 2 and 3, the vinyl chloride resins (1) have a larger average polymerization degree than that in Example 1, and therefore larger amounts of the trimellitic ester (2) were used, whereby the molded articles showing good performances in the measurement of the elongation after degradation test and the air bag expansion test were obtained.

Blended in Example 4 is the trimellitic ester (2) in which a carbon number of a principal chain in an alkyl group is reduced from 8 to 6 in comparison with Example 1. In Example 4, the use amount of the trimellitic ester (2) is the same as in Example 1, and therefore the coldproof property as measured by the elongation after degradation test is a little reduced as compared with that in Example 1 but has been judged to fall within the acceptance range.

In Example 5, the use amount of the trimellitic ester (2) was increased by 10 parts by weight in comparison with that in Example 4. As a result thereof, the coldproof property as measured by the elongation after degradation test was raised.

Comparing Example 5 with Example 1 in a coldproof property as measured by an elongation after degradation test, it can be found that a reduction by 2 carbons in a carbon number of a principal chain in the alkyl group of the trimellitic ester (2) is almost equivalent to an increase by 10 parts by weight in the use amount of the trimellitic ester (2).

Blending in Example 6 is the trimellitic ester (2) in which a carbon number of a principal chain in an alkyl group is slightly reduced from 8 to 7.74 in terms of an average value in comparison with Example 1. In Example 6, the use amount of the trimellitic ester (2) is the same as in Example 1, and the elongation after degradation test is a little reduced as compared with that in Example 1. Considering such result obtained in Example 6 altogether with the preceding result obtained in Example 4, it is observed that the carbon number in the alkyl group of the trimellitic ester (2) exerts an influence on the coldproof property.

Blending in Example 7 are the vinyl chloride resin (1) in which an average polymerization degree is elevated from 1000 to 1300 and the trimellitic ester (2) in which a carbon number of a principal chain in an alkyl group is slightly raised from 6 to 6.75 in terms of an average value in comparison with Example 5. The elongation after degradation test is improved, and therefore it is suggested that an increase in the carbon number of the principal chain in the alkyl group of the trimellitic ester (2) compared with an increase in the average polymerization degree of the vinyl chloride resin (1) exerts a larger influence on the coldproof property.

Neglecting a difference in the fine vinyl chloride resins (3), blended in Example 8 is the triellitic ester (2) in which a carbon number of a principal chain in an alkyl group is raised from 6.75 to 9 and the use amount thereof is reduced from 110 parts by eight to 100 parts by weight in comparison with Example 7. It can be found that the coldproof property as measured by the elongation after degradation test become almost equivalent by adjusting these factors.

Blended in Example 9 is the trimellitic ester (2) in which the use amount is reduced by 5 parts by weight in comparison with that in Example 8. As a result thereof, the coldproof property after the degradation test was slightly reduced as compared with Example 8 while falling within the acceptance range.

Both Comparative Examples 1 and 2 using the vinyl chloride resins having smaller internal pore volumes than specified in the present invention showed unsatisfactory results. In particular, in Comparative Example 2 using the vinyl chloride resin having a markedly small internal pore volume, the depowdering property was inferior, so that a sheet having a fixed thickness could not be molded, and therefore the other tests could not be carried out.

In Comparative Example 3 in which the value of the equation (I) is smaller than the specified range of the present invention, the melt property was inferior, and unsatisfactory results were given in the elongation after degradation test which was a measure for the coldproof property and the expansion test of an air bag.

In Comparative Example 4 using the fine vinyl chloride resin $a_3$ having a larger average polymerization degree than specified in the present invention while having a two mode grain size distribution falling in the scope of the present invention, the melt property showed an inferior result.

In Comparative Examples 5 and 6 using the fine vinyl chloride resins $b_1$ and $b_2$ each having a grain size distribution close to a normal distribution, fogging is serious. Further, in Comparative Example 7 using the fine vinyl chloride resin c having a grain size distribution of one mode, the depowdering property was inferior, so that a uniform sheet could not be molded, and therefore the tests could not be carried out.

It is apparent from the results of the examples and comparative examples described above that the present invention can provide the vinyl chloride resin compositions for powder slush molding which are improved in a fogging property, a depowdering property, a melt property, a cold-proof property, a thermal degradation resistance and an air bag expanding property.

We claim:

1. A vinyl chloride resin composition for powder molding comprising:
   (1) 100 parts by weight of a vinyl chloride resin powder having an average polymerization degree p of 600 to 3000 and an internal pore volume of 0.20 ml/g or more,
   (2) 80 to 150 parts by weight of a trimellitic ester having an alkyl group with a principal chain having an average carbon number n of 6 to 9, and
   (3) 5 to 25 parts by weight of a fine vinyl chloride resin having an average polymerization degree q of 400 to 1300 and a primary grain size distribution of two modes in which a smaller mode falls in a grain size range of 0.1 to 0.4 μm and a larger mode falls in a grain size range of 0.9 to 1.4 μm, wherein the parts by weight L of the trimellitic ester shown in (2), p and n each described above have the relation satisfying an equation (I):

$$5<[\{(n-8)\times 5+L\}/p]\times 100<12 \tag{I}$$

2. The composition of claim 1, wherein the vinyl chloride resin powder (1) has an average polymerization degree p of 800 to 2500.

3. The composition of claim 1, wherein the vinyl chloride resin powder (1) has an internal pore volume of 0.25 ml/g or more.

4. The composition of claim 1, wherein a principal chain of an alkyl group in the trimellitic ester (2) has an average carbon number n of 7 to 8.

5. The composition of claim 1, wherein 1 to 30% by weight of the fine vinyl chloride resin (3) falls in a grain size range of 0.1 to 0.4 μm.

6. The composition of any of claims 1 to 5, comprising 100 parts by weight of the vinyl chloride resin (1), 90 to 140 parts by weight of the trimellitic ester (2) and 8 to 17 parts by weight of the fine vinyl chloride resin (3).

* * * * *